(No Model.)  3 Sheets—Sheet 1.

E. A. SPERRY.
ELECTRIC BRAKE.

No. 565,937. Patented Aug. 18, 1896.

Witnesses.
Louis P. Abell
J. B. McGire.

Inventor.
Elmer A. Sperry (No Model.) 3 Sheets—Sheet 2.

E. A. SPERRY.
ELECTRIC BRAKE.

No. 565,937. Patented Aug. 18, 1896.

Witnesses.
Louis P. Abell
J. B. McGirr.

Inventor.
Elmer A. Sperry (No Model.)

E. A. SPERRY.
ELECTRIC BRAKE.

No. 565,937. Patented Aug. 18, 1896.

3 Sheets—Sheet 3.

WITNESSES.
A.H. Abell.
A.F. Macdonald.

INVENTOR.
Elmer A. Sperry by
Geo. R. Blodgett
atty.

UNITED STATES PATENT OFFICE.

ELMER A. SPERRY, OF CLEVELAND, OHIO, ASSIGNOR TO THE GENERAL ELECTRIC COMPANY, OF NEW YORK.

ELECTRIC BRAKE.

SPECIFICATION forming part of Letters Patent No. 565,937, dated August 18, 1896.

Application filed February 16, 1895. Serial No. 538,665. (No model.)

*To all whom it may concern:*

Be it known that I, ELMER A. SPERRY, a citizen of the United States, residing at Cleveland, in the county of Cuyahoga, State of Ohio, have invented certain new and useful Improvements in Electric Brakes, of which the following is a specification.

My invention relates to mounting electric brakes for vehicles, more especially that class used upon tram-cars where the brake or a portion thereof receives support from the car-truck or other portion of the vehicle and also receives guidance and support from the axle or axles of such vehicle or car. It also relates to various details of construction of the magnets and other devices connected with the use of such brakes and also where the braking parts are used in connection or near to the wheels of the vehicle, all of which are fully described herein and especially set forth in the claims hereto annexed and illustrated in the accompanying drawings.

Figure 1:
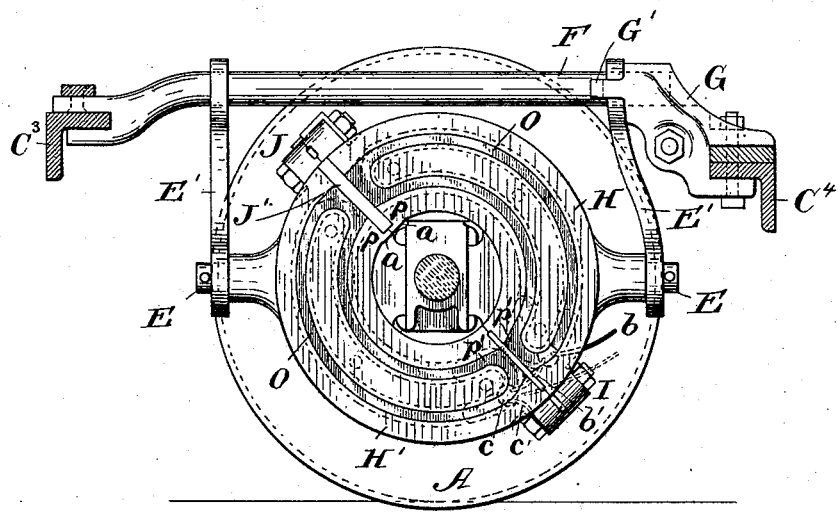
Figure 6:
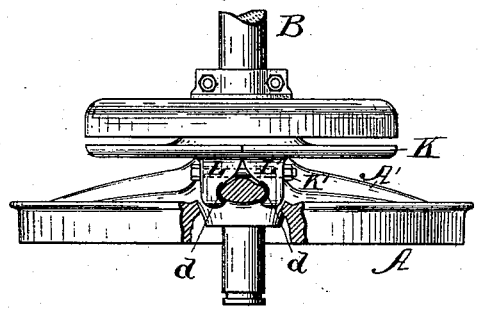
Figure 7:
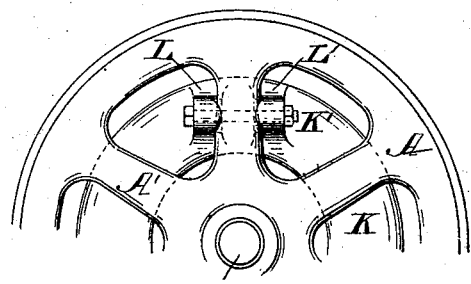
Figure 8:
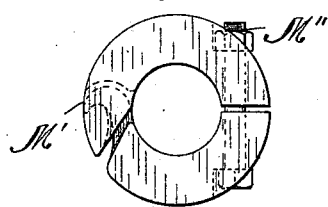
Figure 2:
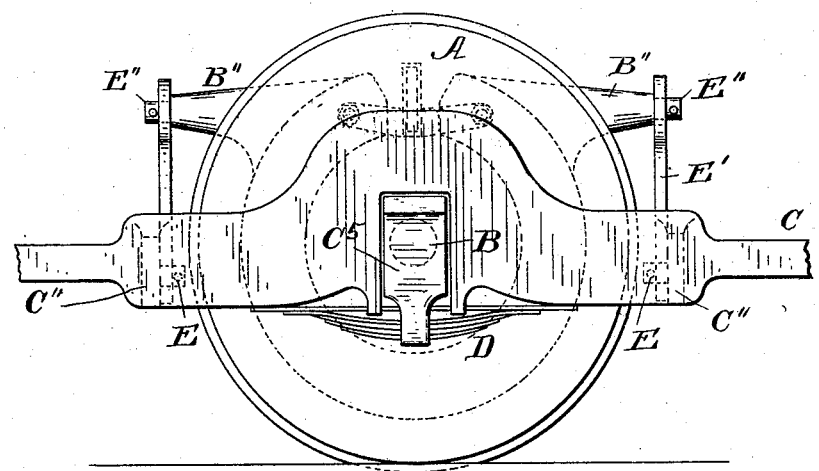
Figure 3:
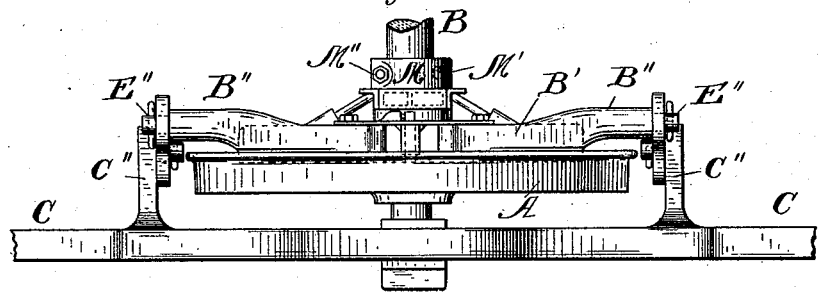
Figure 4:
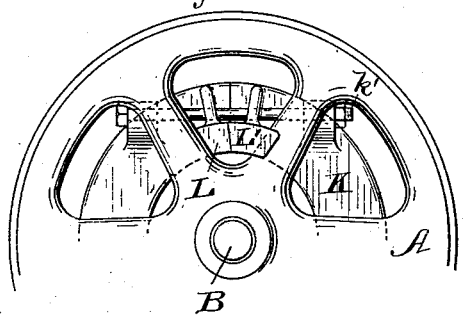
Figure 5:
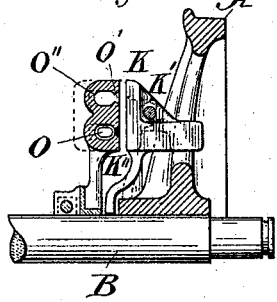
Figure 9:
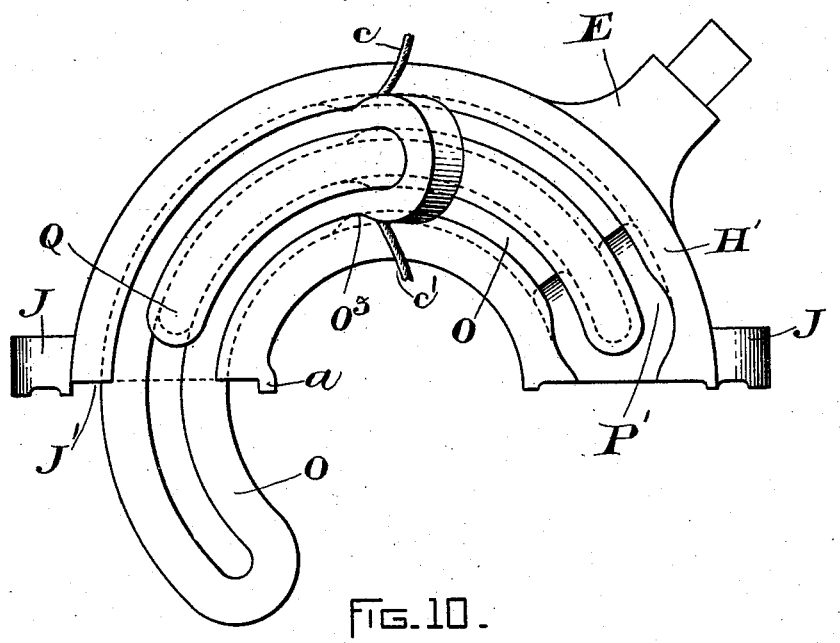
Figure 10:
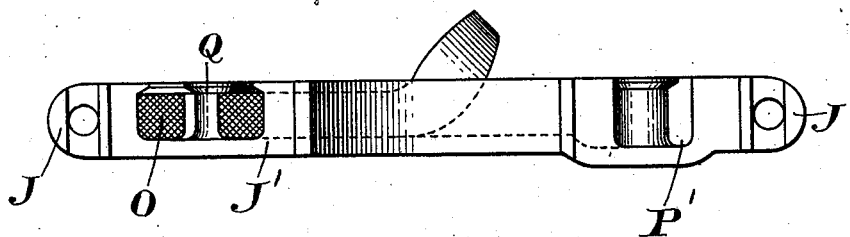

In the accompanying drawings, attached to and made a part of this specification, Figure 1 is a side elevation, partly in section, of the brake-shoe and suspension. Fig. 2 is a partial side view of a truck, showing a modification of the shoe and suspension. Fig. 3 is a plan view of the shoe and suspension as shown in Fig. 2. Figs. 4 and 5 are details showing means for securing the brake-disk to the wheels. Figs. 6 and 7 are modifications of the disk suspension. Fig. 8 is a detail of the axle-collar. Figs. 9 and 10 are views showing the method of inserting the coils in the brake-shoes.

Two L-shaped beams $C^3$ $C^4$ extend across the truck from side to side, and mounted thereon is the cylindrical rod F, supported at one end by the socket G and at the other by the beam $C^3$. The shoe is suspended by links E' E', supported by means of the cylindrical rod F. Cast integral with the socket G, or secured thereto, is a lug G', which extends in front of the link E', preventing it from moving laterally on the rod F.

The brake-shoe is composed of two semicircular parts H and H'. These are provided with grooves containing the energizing-coils O O. Lugs J J and bolts I I are provided for securing the two parts of the shoe together. These are preferably so arranged that they do not extend above or below the outer periphery of the shoe. By arranging the parts as described the brake-magnet occupies no more vertical space than it would if it had a smooth periphery, and by placing the lugs so that they do not project below the bottom of the magnet any obstruction which is cleared by the magnet itself will not interfere with the lugs. The dividing-line of the shoe is preferably a diagonal, as this will permit the suspension to be made on a horizontal line with the center of gravity. At the dividing-line of the shoe is formed a pocket J', in which is mounted a hard lubricant, as carbon or graphite, for the purpose of lubricating the shoe and its engaging disk. The lubricating-brush is arranged to extend across the entire face of the shoe, and to provide for this the lugs $a$ $a$ are employed, which extend toward the center and form the inner end of the pocket J'. The lugs E E are cast radial with respect to the center of the shoe, and when the parts are assembled they are in the same plane and in a horizontal line with the center of gravity. As the shoe is made in parts and the line of division a diagonal one, the supporting-lugs on each half of the shoe are nearer one end than the other.

The brake-disk K is rigidly secured to the axle B and maintains a fixed distance from the wheel A, the brake-shoe moving toward and away from the disk. The links E' E' are so arranged, by giving them a slight slant away from the disk, that upon cessation of the current in the energizing-coils the shoe will be automatically pulled away from the disk.

Referring to Figs. 9 and 10, the mode of inserting the energizing-coils in the brake-shoes will be described. The coils O are first wound with the desired number of turns in a crescent shape and provided with terminals $c$ $c'$ or $b$ $b'$. The coil is bent upward at one end and made slightly thinner at $O^3$ to allow it to pass through the contracted opening O' at the surface of the shoe. The slot in the shoe may have any desired dimensions, but it is preferable to have the opening at the friction or wearing surface slightly contracted in order to hold the coil in place. The coil is inserted into the slot from the end forming the pocket J' and worked around until the rear end of the coil engages with the central core Q of the shoe. The forward end is then hammered down into the enlarged recess P' P', after which the entire coil is covered with Babbitt or a similar metal, which serves to hold the coil in place. The Babbitt metal or filler also serves to form part of the pocket J', in which the lubricant is placed. The coils at the terminal end approach nearer to each other than at the other end. This allows room for the lubricating-brush and insulation of the coils. The coils are connected in any desired manner. In the present case the current enters by lead $b$ through the coil to the lead $b'$, thence to lead $c$ and the coil to lead $c'$, which is grounded on the frame.

Fig. 2 shows a modification in which the truck-frame C is mounted on a suitable pedestal-box $C^5$ in any of the well-known ways. The frame C is provided with lateral projections $C''$ $C''$, from which are supported the links E' E', extending upward in this case instead of downward, as in Fig. 1. The brake-shoe shown in this figure differs slightly from the one above described in that it is made up of one crescent-shaped unit instead of two. This shoe is provided with lugs B'' B'', having trunnions E'' E'', which furnish the bearings for the links E' E'. To regulate the horizontal movement of the brake-shoe, a collar M is mounted on the axle B, consisting of a ring made in two parts hinged by means of a hook and cross-piece at M' and secured by a bolt M''.

Figs. 4 and 5 show means for supporting the brake-disk, in which the disk K is made in two parts, having lugs L L' cast on the back and adapted to engage with the spokes A' of the wheel A. The part of the shoe bearing the hook-shaped lug L' is first placed in position, then the part bearing the lug L, forcing the hooked lug L' into engagement with the spoke A, after which the bolt $k'$ is inserted in place, holding the two halves together and in engagement with the spokes of the wheel. It will be understood that similar lugs and a bolt will be used on the other half of the shoe. The disk K is provided with a projection or flange K'', which runs down to the axle or hub of the wheel and thereby serves to centralize the disk.

As no two manufacturers make wheels alike it is necessary to provide means for compensating the difference. This is accomplished by casting lugs on the disk, as before, arranged to clasp the spokes of the wheel more or less tightly and filling in the space between the arms and the lugs with Babbitt or other similar metal.

In Fig. 6 is shown a brake-disk K, with lugs L L' cast on the back and partially encircling the spoke A' of the wheel A. The bolt $K^7$ serves to hold the two parts of the shoe together, and the space between the lugs L L' and the arm is filled with Babbitt metal $d$ $d$.

Fig. 7 shows a slight modification of the above, in which the lugs L L' project outward from the disk K and engage on either side of a lug (shown in dotted line) cast on the spoke A'. The space between the lugs is filled with Babbitt metal, as before.

Having thus fully described my invention, what I claim is—

1. In a brake for arresting motion, a circular magnet constructed in parts, means for securing the parts together, a coil, a groove narrower at its face for the coil in one of the parts of said magnet opening into the joint between the parts.

2. In a brake for arresting motion, a circular magnet constructed in parts, means for securing the parts together, a coil, a groove narrower at its face for the coil in one of the parts of said magnet opening into the joint between the parts and means for closing the opening at said joint.

3. In a brake for arresting motion, a circular magnet constructed in parts, means for securing the parts together, a coil, a groove for the coil narrower at its face sunk in one of the faces of the magnet, the larger portion of the said groove opening into the joint between the parts.

4. In a brake-shoe for arresting motion, a circular magnetic structure constructed in parts, means for securing the parts together, a plurality of coils, a plurality of grooves narrower at the working faces, in which the coils are placed, and openings into the joint between the parts in groups of two.

5. In a brake for arresting motion, a circular magnet, a groove in one of the faces of the magnet having one end opening into a transverse recess or incision in such magnet, the groove being deeper at a point near the other end of the groove from such opening, and a coil for such magnet with a thicker portion organized to occupy the said deeper portion of the recess.

6. In a brake for arresting motion, a brake-magnet having a braking-face constructed in parts, means for securing the parts together at the joint, the abutment of the parts being situated outside of the line of the braking-face, and a slot adjacent to the abutment, forming a pocket for a lubricant extending across the face.

7. The combination of a truck with a diagonally-split brake-shoe suspended from the truck at two points in a horizontal line with the center of gravity of the brake-shoe.

8. The combination of a truck, a diagonally-split brake-shoe suspended from the truck at two points in a horizontal line with the center of gravity of the brake-shoe, and energizing-coils so disposed in the shoe that it may be separated without removing the coils.

9. An electric brake-shoe split on a diagonal, in combination with clamping-lugs situated respectively between the center line and the top and between the center line and the bottom of the shoe.

10. An electric brake-shoe split on a diagonal, in combination with clamping-lugs situated respectively between the center line and the top and between the center line and the bottom of the shoe, and trunnions for supporting the shoe.

11. The combination of an electric brake-shoe split on a diagonal with clamping-lugs and radial trunnions in line with the center of gravity.

12. In an electric brake, the combination of clamping-lugs outside the working face, a slot for the lubricator extending across the working face, and integral radial supporting-lugs.

13. As an article of manufacture, a part of an electric brake-shoe comprising a semicircular piece provided with coil grooves in its working face, and a radial trunnion nearer one end than the other of the portion to which it is secured.

14. As an article of manufacture, a crescent-shaped brake-shoe provided with coil grooves in the working face, supporting-lugs cast radial with respect to the center of the shoe, and an enlarged recess at one end of the shoe.

15. As an article of manufacture, a crescent-shaped brake-shoe provided with coil grooves, attaching-lugs, and an integral and radial supporting-lug.

16. An electric brake-shoe provided with a plurality of energizing-coils approaching each other nearer at one end than the other, and a pocket for a lubricator between the ends of the energizing-coils which are farthest apart.

17. An electric brake-shoe provided with a plurality of energizing-coils approaching each other nearer at one end than the other, and enlarged recesses at the end where the coils are nearer.

18. An electric brake-shoe made in two equal parts, each part having a radial lug in combination with suspension-links attached to the radial lugs in a horizontal line with the center of gravity.

19. An electric brake-shoe composed of a plurality of members, in combination with suspension-links, and lugs to which the links are attached, the lugs being nearer one end than the other of the part to which they are attached.

20. In an electric brake, the combination of a diagonally-split brake-shoe, links for supporting it, clamping-lugs between the center line and the top and between the center line and the bottom of the shoe, and a friction-disk clamped to the arms of the wheel.

21. In an electric brake, the combination of a brake-disk made in two parts, a hooked lug cast on the back of one of the parts engaging with a spoke of the wheel, and a lug cast on the other part of the disk arranged to hold the hooked lug in place, and means for securing the parts.

22. The combination of a brake-disk made in two parts, a wheel, a hooked lug cast on the back of one part of the disk, a lug cast on the other part arranged to force the first lug into engagement with a part of the wheel, and a bolt for clamping the parts of the disk to the wheel.

23. In an electric brake, the combination of an energizing-magnet suspended from the truck, a friction-disk secured to the wheel and engaging with the magnet, and a centralizing device for the disk.

24. In an electric brake, the combination of an energizing-magnet suspended from the truck, a friction-disk secured to the wheel and engaging with the magnet, and a projection from the disk engaging with the hub for centralizing it.

25. In an electric brake, the combination of an energizing-magnet, a friction-disk engaging therewith, lugs cast on the back of the disk loosely encircling the spokes of the wheel, and a soft-metal filler between the lugs and the spokes.

ELMER A. SPERRY.

Witnesses:
A. R. APPLEMAN, Jr.,
E. A. PITKIN.